(12) United States Patent
Yang et al.

(10) Patent No.: US 12,553,717 B2
(45) Date of Patent: Feb. 17, 2026

(54) MEMS GYROSCOPE AND ELECTRONIC PRODUCT TECHNICAL FIELD

(71) Applicant: AAC Kaitai Technologies (Wuhan) CO., LTD., Hubei (CN)

(72) Inventors: Shan Yang, Wuhan (CN); Xiao Kan, Wuhan (CN); Zhan Zhan, Wuhan (CN); Shitao Yan, Wuhan (CN); Zhao Ma, Wuhan (CN); Hongtao Peng, Wuhan (CN); Houming Chong, Johor (MY); Zaixiang Pua, Singapore (SG); Kahkeen Lai, Singapore (SG); Veronica Tan, Singapore (SG); Yang Li, Wuhan (CN)

(73) Assignee: AAC Kaitai Technologies (Wuhan) CO., LTD., Wuhan (CN)

( * ) Notice: Subject to any disclaimer, the term of this patent is extended or adjusted under 35 U.S.C. 154(b) by 306 days.

(21) Appl. No.: 18/324,178

(22) Filed: May 26, 2023

(65) Prior Publication Data
US 2024/0271932 A1 Aug. 15, 2024

Related U.S. Application Data

(63) Continuation of application No. PCT/CN2023/086886, filed on Apr. 7, 2023.

(30) Foreign Application Priority Data

Feb. 15, 2023 (CN) .......................... 202310131702.2

(51) Int. Cl.
*G01C 19/00* (2013.01)
*G01C 19/574* (2012.01)

(52) U.S. Cl.
CPC ......... *G01C 19/005* (2022.01); *G01C 19/574* (2013.01)

(58) Field of Classification Search
None
See application file for complete search history.

(56) References Cited

U.S. PATENT DOCUMENTS

| | | | |
|---|---|---|---|
| 5,895,850 A * | 4/1999 | Buestgens | G01C 19/574 73/504.12 |
| 8,616,057 B1 * | 12/2013 | Mao | G01C 19/574 73/504.12 |
| 10,591,505 B2 * | 3/2020 | Tocchio | G01P 1/006 |
| 11,193,771 B1 * | 12/2021 | Gregory | G01C 19/5712 |

(Continued)

*Primary Examiner* — Mark A Shabman
(74) *Attorney, Agent, or Firm* — Wiersch Law Group

(57) ABSTRACT

The present invention provides an MEMS gyroscope and an electronic product. The MEMS gyroscope comprises a plurality of first mass blocks, a second mass block and coupling parts, wherein the plurality of first mass blocks are located at two opposite sides of the second mass block in a first direction; and each coupling part comprises a coupling link and a plurality of connecting beams connected to two ends of the coupling link, the connecting beams are flexible beams, and the coupling part is positioned between the first mass blocks and the second mass block and connects the first mass blocks with the second mass block. Through the arrangement of the coupling links, strong coupling can be realized between the first mass blocks and the second mass block, so that the anti-interference performance of the MEMS gyroscope is enhanced during work and the working stability is improved.

8 Claims, 3 Drawing Sheets

(56) References Cited

U.S. PATENT DOCUMENTS

| | | | |
|---|---|---|---|
| 2012/0060604 A1* | 3/2012 | Neul | G01P 3/44 |
| | | | 73/504.12 |
| 2017/0261322 A1* | 9/2017 | Gattere | G01C 19/5712 |
| 2020/0309806 A1* | 10/2020 | Pruetz | G01P 3/44 |

* cited by examiner

MEMS GYROSCOPE AND ELECTRONIC PRODUCT TECHNICAL FIELD

TECHNICAL FIELD

The present invention relates to the technical field of gyroscopes, in particular to a micro electro mechanical systems (MEMS) gyroscope and an electronic product.

BACKGROUND

An MEMS gyroscope is a micro angular velocity sensor made by micro-machining technology and microelectronics technology. A driving mode of the MEMS gyroscope swings around an axis perpendicular to a mass block. When an angular velocity is applied, the gyroscope transfers energy to a detection mode under the Coriolis effect, which makes the mass block swing out of the plane under relative driving. The angular velocity can be obtained by detecting the out-of-plane swing displacement of the mass block.

For an MEMS gyroscope in the related art, mass blocks are weakly coupled, and the displacement ratio of the mass blocks cannot be guaranteed.

Therefore, it is necessary to provide a novel MEMS gyroscope to solve the above problems.

SUMMARY

The present invention aims to provide an MEMS gyroscope and an electronic product, which can realize strong coupling between a first mass block and a second mass block, enhance the anti-interference performance of the MEMS gyroscope during work, and improve the working stability.

The technical scheme of the present invention is as follows.

A first aspect of the present invention provides an MEMS gyroscope, comprising:
- a plurality of first mass blocks and a second mass block, the plurality of first mass blocks being located at two opposite sides of the second mass block in a first direction; and
- a coupling part comprising a coupling link and a plurality of connecting beams connected to two ends of the coupling link, wherein the connecting beams are flexible beams, the coupling part is positioned between the first mass blocks and the second mass block and connects the first mass blocks with the second mass block, the connecting beam connected to one end of the coupling link is connected to the first mass blocks, and the connecting beam connected to the other end of the coupling link is connected to the second mass block.

In one possible design, the first mass blocks are connected to the second mass block through the plurality of coupling parts.

In one possible design, the first mass block has a first end and a second end in a second direction perpendicular to the first direction, the first end is connected to the second mass block through one of the coupling parts, and the second end is connected to the second mass block through another coupling part.

In one possible design, the plurality of first mass blocks located at the two opposite sides of the second mass block are symmetrically arranged in the first direction.

In one possible design, the plurality of the coupling parts located at two opposite sides of the second mass block are symmetrically arranged in the first direction.

In one possible design, the MEMS gyroscope further comprises a plurality of driving members, a plurality of decoupling members and a plurality of coupling beams, wherein in a second direction perpendicular to the first direction, the plurality of decoupling members are oppositely arranged, the first mass blocks and the second mass block are located between the plurality of decoupling members, each decoupling member and the first mass block opposite the decoupling member are connected through the coupling beam, and each decoupling member is connected to the plurality of driving members.

In one possible design, the plurality of coupling beams connected to the same decoupling member are symmetrically arranged in the first direction, and the plurality of coupling beams located at two opposite sides of the first mass blocks are symmetrically arranged in the second direction; the decoupling members located at one side of the first mass blocks and the second mass block and the driving members connected thereto and the decoupling members located at the other side of the first mass blocks and the second mass block and the driving members connected thereto are symmetrically arranged in the second direction; and the plurality of the driving members connected to the same decoupling member are symmetrically arranged in the first direction.

In one possible design, the MEMS gyroscope further comprises a plurality of first anchor points, wherein each decoupling member is correspondingly provided with a plurality of the first anchor points, and one end of the driving member is connected to the decoupling member and the other end is connected to the first anchor point.

In one possible design, the MEMS gyroscope further comprises a plurality of second anchor points, a first torsion beam and a second torsion beam, wherein both the first torsion beam and the second torsion beam are flexible beams; a central area of each first mass block is provided with a first through hole, a central area of the second mass block is provided with a second through hole, and both the first through hole and the second through hole are provided with the second anchor points inside; and an inner wall of the first through hole is connected to the second anchor point located in the first through hole through the first torsion beam, and an inner wall of the second through hole is connected to the second anchor point located in the second through hole through the second torsion beam.

A second aspect of the present invention also provides an electronic product, which comprises:
- a body; and
- the above MEMS gyroscope, wherein the MEMS gyroscope is installed on the body.

The invention has the following beneficial effects.

According to the MEMS gyroscope and the electronic product provided by the present invention, in the MEMS gyroscope, the first mass blocks and the second mass block are connected through the coupling links and the plurality of connecting beams connected to the two ends of each coupling link, so that strong coupling is realized between the first mass blocks and the second mass block, the displacement ratio of the first mass blocks to the second mass block is ensured on the premise that machining errors exist, and the redundancy of the MEMS gyroscope to the process is improved. Moreover, compared with the weak coupling connection mode between mass blocks in the related art, the frequency difference between a working mode and an interference mode is widened under the condition of strong coupling, so that the anti-interference performance of the MEMS gyroscope is enhanced during work, and the working stability is improved, thereby improving the service performance of the electronic product.

LIST OF REFERENCE NUMERALS

1—first mass block; 11—first end; 12—second end; 13—first through hole;
2—second mass block; 21—second through hole;
3—coupling part; 31—coupling link; 32—connecting beam;
4—driving member;
5—decoupling member;
6—coupling beam;
71—first torsion beam;
72—second torsion beam;
81—first anchor point;
82—second anchor point.

DETAILED DESCRIPTION OF EMBODIMENTS

The present invention will be further described below with reference to the accompanying drawings and embodiments.

Figure 1:
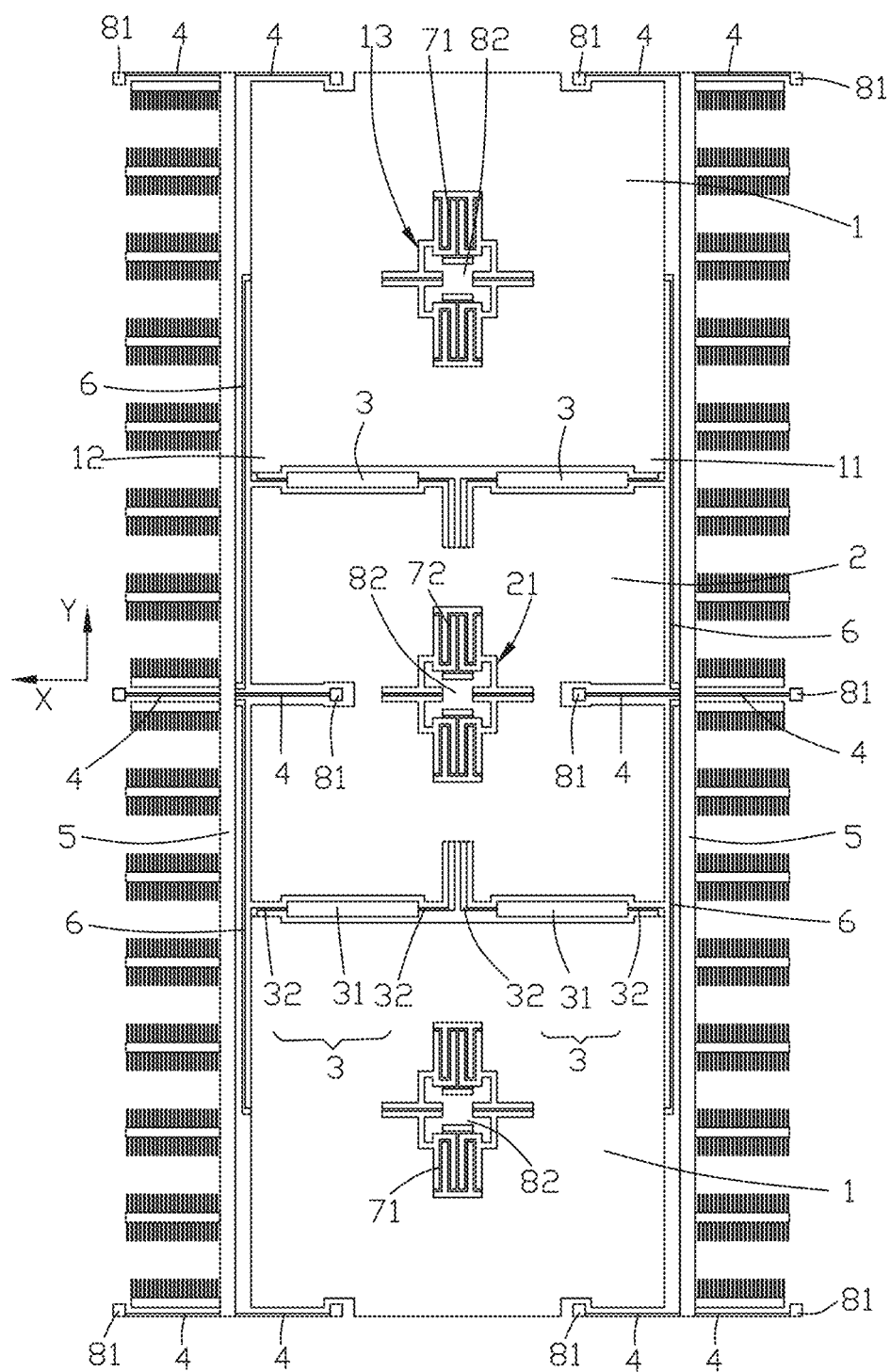
FIG. 1 is a front view of an MEMS gyroscope provided by the present invention in a specific embodiment.

The present invention provides an MEMS gyroscope. As shown in FIG. 1, the MEMS gyroscope comprises a plurality of first mass blocks 1, a second mass block 2 and coupling parts 3, wherein the plurality of first mass blocks 1 are located at two opposite sides of the second mass block 2 in a first direction Y; and each coupling part 3 comprises a coupling link 31 and a plurality of connecting beams 32 connected to two ends of the coupling link 31, the connecting beams 32 are flexible beams, the coupling part 3 is positioned between the first mass blocks 1 and the second mass block 2 and connects the first mass blocks 1 with the second mass block 2, the connecting beam 32 connected to one end of the coupling link 31 is connected to the first mass blocks 1, and the connecting beam 32 connected to the other end of the coupling link 31 is connected to the second mass block 2.

In this embodiment, through the arrangement of the coupling links 31, strong coupling is realized between the first mass blocks 1 and the second mass block 2, the displacement ratio of the first mass blocks 1 to the second mass block 2 is ensured on the premise that machining errors exist, and the redundancy of the MEMS gyroscope to the process is improved. Moreover, compared with the weak coupling connection mode between mass blocks in the related art, the frequency difference between a working mode and an interference mode is widened under the condition of strong coupling, so that the anti-interference performance of the MEMS gyroscope is enhanced during work, and the working stability is improved.

In a specific embodiment, the first mass blocks 1 are connected to the second mass block 2 through the plurality of coupling parts 3, which further improves the coupling strength between the first mass blocks 1 and the second mass block 2.

Specifically, as shown in FIG. 1, the first mass block 1 has a first end 11 and a second end 12 in a second direction X perpendicular to the first direction Y, the first end 11 is connected to the second mass block 2 through one of the coupling parts 3, and the second end 12 is connected to the second mass block 2 through another coupling part 3.

In a specific embodiment, the plurality of first mass blocks 1 located at the two opposite sides of the second mass block 2 are symmetrically arranged in the first direction Y.

Further, the plurality of the coupling parts 3 located at two opposite sides of the second mass block 2 are symmetrically arranged in the first direction Y.

For example, as shown in FIG. 1, the first direction Y is defined as a direction where a Y axis is located, and the second direction X is defined as a direction where an X axis is located. Two first mass blocks 1 located at the two opposite sides of the second mass block 2 are symmetrical with respect to the X axis. Moreover, the plurality of coupling parts 3 located at the two opposite sides of the second mass block 2 are symmetrical with respect to the X axis. In addition, two coupling parts 3 located at the same side of the second mass block 2 and connected to the second mass block 2 are symmetrical with respect to the Y axis.

This arrangement allows the compact structure and miniaturization design of the MEMS gyroscope to be realized.

In a specific embodiment, the MEMS gyroscope further comprises a plurality of driving members 4, a plurality of decoupling members 5 and a plurality of coupling beams 6, wherein in a second direction X perpendicular to the first direction Y, the plurality of decoupling members 5 are oppositely arranged, the first mass blocks 1 and the second mass block 2 are located between the plurality of decoupling members 5, each decoupling member 5 and the first mass block 1 opposite the decoupling member are connected through the coupling beam 6, and each decoupling member 5 is connected to the plurality of driving members 4.

The MEMS gyroscope has a driving mode and a detection mode. For example, as shown in FIG. 1, in the first direction Y, two first mass blocks 1 are located at two opposite sides of one second mass block 2, and each first mass block 1 is connected to the second mass block 2 through two coupling parts 3; two decoupling members 5 are located at two opposite sides of the first mass blocks 1 and the second mass block 2 in the second direction X, and the driving members 4 are connected to two ends and the middle of each decoupling member 5 respectively; the first direction Y is defined as the direction where the Y axis is located, the second direction X is defined as the direction where the X axis is located, a Z axis is perpendicular to both the X axis and the Y axis, and the plane where the X axis and the Y axis are located is taken as a datum plane; and the working process of MEMS gyroscope is illustrated by the following example.

Figure 2:
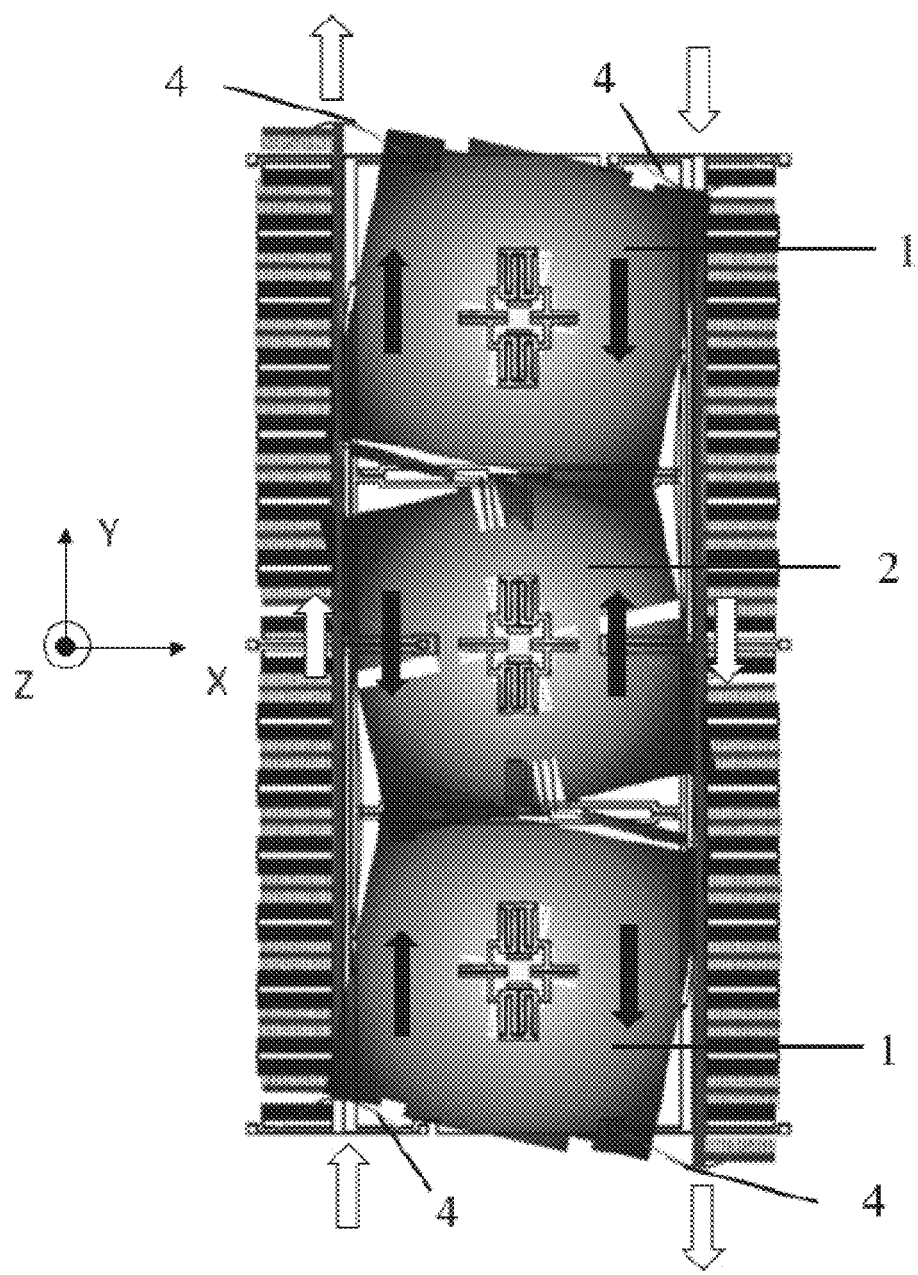
FIG. 2 is a structural diagram of an MEMS gyroscope provided by the present invention in a driving mode.

When detecting an angular velocity, the MEMS gyroscope is first put in the driving mode. As shown in FIG. 2, in the driving mode, the driving members 4 connected to the two decoupling members 5 respectively move in opposite directions (refer to the white arrow in FIG. 2 for the moving direction of the driving members 4). In this case, the driving members 4 drive the decoupling members 5 to move, the decoupling members 5 drive the two first mass blocks 1 to move, and the two first mass blocks 1 drive the second mass block 2 to move (refer to the black arrow in FIG. 2 for the moving directions of the first mass blocks 1 and the second mass block 2), that is, in the driving mode, the first mass blocks 1 and the second mass block 2 will make an in-plane rotational motion (i.e., rotational motion in the datum plane).

Figure 3:
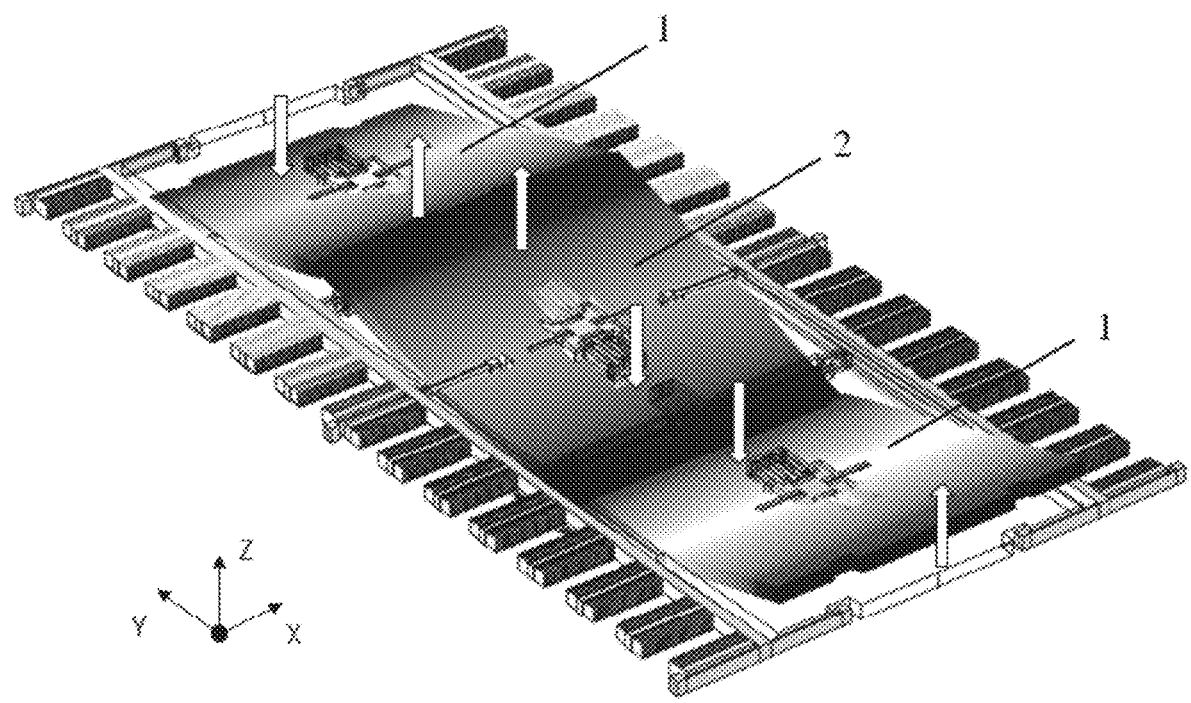
FIG. 3 is a structural diagram of an MEMS gyroscope provided by the present invention in a detection mode.

When the MEMS gyroscope is subjected to the angular velocity of the X axis, the MEMS gyroscope will be converted from the driving mode to the detection mode, as shown in FIG. 3. In this case, both the first mass blocks 1 and the second mass block 2 will be subjected to a Coriolis force in the direction of the Z axis (refer to the white arrow in FIG. 3 for the direction of the Coriolis force), so the first mass blocks 1 and the second mass block 2 will generate an out-of-plane vibration displacement (vibration displacement towards the datum plane) in the Z axis. By detecting the out-of-plane vibration displacement of the first mass blocks 1 and the second mass block 2 in the Z axis, the angular velocity of the MEMS gyroscope around the X axis can be obtained.

In this embodiment, the coupling beam 6 provides a single degree of freedom perpendicular to a movement direction of the driving member 4, that is, the coupling beam 6 has great stiffness in the in-plane driving direction and little stiffness in the out-of-plane detection direction, so that the decoupling member 5 can drive the first mass blocks 1 and the second mass block 2 to move in the driving mode, but basically does not move in the detection mode, thus realizing motion decoupling.

In addition, the first mass blocks 1 and the second mass block 2 are connected through the coupling links 31 and the connecting beams 32 connected to the two ends of the coupling link 31, so that when the MEMS gyroscope works, the first mass blocks 1 and the second mass block 2 move in opposite phases; in this way, the first mass blocks 1 and the second mass block 2 can perform differential detection, thereby resisting the interference of external electrical and mechanical noise and improving the signal-to-noise ratio.

The MEMS gyroscope provided by this embodiment is a single-axis gyroscope, that is, a gyroscope capable of detecting the angular velocity of the X axis or the Y axis.

Specifically, the plurality of coupling beams 6 connected to the same decoupling member 5 are symmetrically arranged in the first direction Y, and the plurality of coupling beams 6 located at two opposite sides of the first mass blocks 1 are symmetrically arranged in the second direction X; the decoupling members 5 located at one side of the first mass blocks 1 and the second mass block 2 and the driving members 4 connected thereto and the decoupling members 5 located at the other side of the first mass blocks 1 and the second mass block 2 and the driving members 4 connected thereto are symmetrically arranged in the second direction X; and the plurality of the driving members 4 connected to the same decoupling member 5 are symmetrically arranged in the first direction Y.

In a specific embodiment, the MEMS gyroscope further comprises a plurality of first anchor points 81, wherein each decoupling member 5 is correspondingly provided with a plurality of the first anchor points 81, and one end of the driving member 4 is connected to the decoupling member 5 and the other end is connected to the first anchor point 81.

For example, as shown in FIG. 1, one decoupling member 5 is correspondingly provided with six first anchor points 81, of which three first anchor points 81 are located at one side of the decoupling member 5 in the second direction X, and the other three first anchor points 81 are located at the other side of the decoupling member 5 in the second direction X.

In a specific embodiment, as shown in FIG. 1, the MEMS gyroscope further comprises a plurality of second anchor points 82, a first torsion beam 71 and a second torsion beam 72, wherein both the first torsion beam 71 and the second torsion beam 72 are flexible beams; a central area of each first mass block 1 is provided with a first through hole 13, a central area of the second mass block 2 is provided with a second through hole 21, and both the first through hole 13 and the second through hole 21 are provided with the second anchor points 82 inside; and an inner wall of the first through hole 13 is connected to the second anchor point 82 located in the first through hole 13 through the first torsion beam 71, and an inner wall of the second through hole 21 is connected to the second anchor point 82 located in the second through hole 21 through the second torsion beam 72.

In this embodiment, both the first torsion beam 71 and the second torsion beam 72 provide degrees of freedom for in-plane rotation and out-of-plane swing, so that when the MEMS gyroscope detects the angular velocity, the stability of the first mass blocks 1 and the second mass block 2 is improved during in-plane rotation and out-of-plane swing.

An embodiment of the present invention also provides an electronic product, which comprises a body and the MEMS gyroscope in any of the above embodiments, and the MEMS gyroscope is installed on the body.

When the electronic product works, the MEMS gyroscope can calculate the angular velocity of the electronic product so as to control of electronic product. In the MEMS gyroscope, the first mass blocks 1 and the second mass block 2 are connected through the coupling links 31 and the plurality of connecting beams 32 connected to the two ends of each coupling link 31, so that strong coupling is realized between the first mass blocks 1 and the second mass block 2, the displacement ratio of the first mass blocks 1 to the second mass block 2 is ensured on the premise that machining errors exist, and the redundancy of the MEMS gyroscope to the process is improved. Moreover, compared with the weak coupling connection mode between mass blocks in the related art, the frequency difference between a working mode and an interference mode is widened under the condition of strong coupling, so that the anti-interference performance of the MEMS gyroscope is enhanced during work, and the working stability is improved, thereby improving the service performance of the electronic product.

The above are only embodiments of the present invention, and it should be pointed out here that for those of ordinary skill in the art, improvements can be made without departing from the inventive concept of the present invention, which belong to the protection scope of the present invention.

What is claimed is:

1. An MEMS gyroscope, comprising:
two first mass blocks (1) and a second mass block (2), the two first mass blocks (1) being located at two opposite sides of the second mass block (2) in a first direction (Y); the second mass block having a first symmetry axis parallel to the first direction and a second symmetry axis perpendicular to the first symmetry axis;
a plurality of coupling parts (3) each comprising a coupling link (31) and two connecting beams (32) connected to two ends of the coupling link (31), wherein the two connecting beams (32) are flexible beams, each of the coupling parts (3) is positioned between the first mass blocks (1) and the second mass block (2) and connects the first mass blocks (1) with the second mass block (2), the connecting beam (32) connected to one end of the coupling link (31) is connected to the first mass blocks (1), and the connecting beam (32) connected to the other end of the coupling link (31) is connected to the second mass block (2);
a plurality of driving members (4) located on two sides of the second mass block (2) along a second direction (X) perpendicular to the first direction (Y);

two decoupling members (5) oppositely arranged along the second direction (X); and a plurality of coupling beams (6); wherein the first mass blocks (1) and the second mass block (2) are located between the two decoupling members (5), each said decoupling member (5) and each of the two first mass blocks (1) opposite the decoupling member (5) are connected through one of the plurality of the coupling beams (6), and each said decoupling member (5) is connected to respective ones of the plurality of driving members (4) located at the same side.

2. The MEMS gyroscope according to claim 1, wherein each said first mass block (1) has a first end (11) and a second end (12) in a second direction (X) perpendicular to the first direction (Y), the first end (11) is connected to the second mass block (2) through one of the coupling parts (3), and the second end (12) is connected to the second mass block (2) through another coupling part (3).

3. The MEMS gyroscope according to claim 1, wherein the two first mass blocks (1) located at the two opposite sides of the second mass block (2) are symmetrically arranged relative to the second symmetry axis.

4. The MEMS gyroscope according to claim 3, wherein the plurality of the coupling parts (3) located at two opposite sides of the second mass block (2) are symmetrically arranged relative to the second symmetry axis.

5. The MEMS gyroscope according to claim 1, wherein the plurality of coupling beams (6) connected to the same decoupling member (5) are symmetrically arranged relative to the second symmetry axis, and the plurality of coupling beams (6) located at two opposite sides of the first mass blocks (1) are symmetrically arranged relative to the first symmetry axis; and the plurality of the driving members (4) connected to the same decoupling member (5) are symmetrically arranged relative to the second symmetry axis.

6. The MEMS gyroscope according to claim 1, further comprising a plurality of first anchor points (81), one end of each of the plurality of driving members (4) is connected to the decoupling member (5) and the other end is connected to one of the plurality of first anchor points (81).

7. The MEMS gyroscope according to claim 6, further comprising three second anchor points (82), a first torsion beam (71) and a second torsion beam (72), wherein both the first torsion beam (71) and the second torsion beam (72) are flexible beams; a central area of each said first mass block (1) is provided with a first through hole (13), a central area of the second mass block (2) is provided with a second through hole (21), and both the first through hole (13) and the second through hole (21) are provided with respective one of the three second anchor points (82) inside; and an inner wall of the first through hole (13) is connected to the second anchor point (82) located in the first through hole (13) through the first torsion beam (71), and an inner wall of the second through hole (21) is connected to the second anchor point (82) located in the second through hole (21) through the second torsion beam (72).

8. An electronic product, comprising:

a body; and the MEMS gyroscope according to claim 1, wherein the MEMS gyroscope is installed on the body.

\* \* \* \* \*